Patented July 31, 1951

2,562,802

UNITED STATES PATENT OFFICE 2,562,802

MANUFACTURE OF KETONE DIARYLAMINE CONDENSATION PRODUCTS

Ivan Mankowich, Naugatuck, and Chalmers H. Day, Watertown, Conn., assignors to United States Rubber Company, New York, N. Y., a corporation of New Jersey No Drawing. Application June 18, 1947,
Serial No. 755,482

8 Claims. (Cl. 260—576)

This invention relates to an improved method of condensing diphenylamine and acetone to form liquid condensation products. In particular, this invention relates to a method whereby such condensation products can be obtained which are characterized by a low viscosity and hence are free flowing.

A variety of factors contribute to, and have an essential bearing on, the nature of the final reaction product of ketones and secondary amines. Among such factors are the type and concentration of catalyst, the concentration and nature of the primary reactants, and the temperature level which is used throughout the reaction itself.

The autoclavic condensation products of acetone and diphenylamine has been sold for many years as a rubber antioxidant under the trade name of BLE. It is a heavy black liquid having a viscosity at 30° C. in the neighborhood of 300-500 poises which must be warmed to make it free flowing. We have discovered a method of preparing a condensation product of acetone and diphenylamine equivalent to the original viscous product BLE as a rubber antioxidant, but of substantially lower viscosity, i. e., having a viscosity in the range of 1 to 100 poises, preferably from 5 to 70 poises, at 30° C.

Several ways are known of condensing diphenylamine and acetone to give antioxidant products ranging from solid materials (Meuser and Leaper U. S. Patent No. 2,002,642) to heavy liquids (Meuser U. S. Patent No. 1,975,167). The Meuser Patent No. 1,975,167 discloses the autoclavic preparation of the condensate of acetone and diphenylamine. The invention of this patent is an improvement upon the Meuser patent.

Under the ordinary practice, as disclosed by Meuser, the mix of acetone and diphenylamine in the approximate molar ratios of 2:1 are heated at approximately 250° C. for 20 to 22 hours, after build-up of temperature, in the presence of a small, i. e., catalytic amount of a bromide or iodide catalyst. The autoclave is discharged either by first valving off the acetone and water vapor, or by discharging the whole of the reaction mixture from the autoclave. The product, after cooling, is washed with aqueous alkali, then with water until neutral, and finally dried.

In the practice of the present invention, the acetone and diphenylamine are autoclaved at a temperature of 275-310° C. (after temperature build-up) and at a pressure greater than atmospheric, for from 3 to 10 hours, preferably in the presence of at least one catalyst such as iodine, hydriodic acid, bromine, hydrobromic acid, or the bromides and iodides of the non-lead heavy metals, especially ferrous iodide, and subsequently discharging the entire contents of the autoclave, cooling to about 150° C. or below, which usually occurs spontaneously by evaporation of the acetone, or by a separate receiver equipped with a condenser or otherwise, drying under vacuum to remove volatiles, such as free acetone, optionally washing with aqueous alkali and/or water for a time sufficient to remove acidic catalysts as such, and then finally drying. Other catalysts as disclosed in the Meuser U. S. Patent No. 1,975,167 may be used, but the most efficient results follow from the above enumerated catalysts. The concentration of the catalyst may be varied from 0.2 to 1.2 (on the halogen basis) to 100 parts diphenylamine.

In this way, a composite condensation product characterized by a viscosity of 1 to 100 poises at 30° C. is obtained which is substantially equivalent as a rubber antioxidant, especially in preventing the deterioration due to mechanical flexing, to the heavy viscous oil prepared by Meuser Patent No. 1,975,167.

If, in the above manufacturing process, temperatures below 275° C., e. g., 250° C., are used the viscosity tends to increase above 100 poises which is undersirable. Temperatures above 310° C. are not desired because of the sacrifice of economy of production due to more costly autoclaves and higher maintenance costs. Also, above 310° C. the viscosities of the condensation products start to rise above 100 poises.

It is known that the viscous condensate of acetone and diphenylamine contains about 18–23% diphenylamine. It is also known that this viscosity can be reduced by the addition of diphenylamine. However, the low viscosity of our composite product is not due to an increased amount of diphenylamine since, indeed the diphenylamine content of our product varies from 10–20%, but is due to some change by the aforesaid process in the composition as a whole, as reflected in the amount of the non-volatile residue remaining from a vacuum distillation at 20 mm. Hg pressure using a temperature of about 150° C. up to 230° C., which residue amounts to 45% or less of the product.

The product after washing and drying is useful for the protection of such rubbers as natural rubber and the rubbery copolymer of butadiene and styrene (GR–S). Preferably, it should be used in dark colored rubber goods because it causes darkening when exposed to the sunlight.

The following example is given to illustrate the invention, the parts being by weight:

Example

In an iron autoclave, 2550 parts of diphenylamine (15.1 pound mols) and 1700 parts acetone (29.3 pound mols) are reacted in the presence of 11.75 parts of iodine in the form of FeI₂.4 H₂O, by heating at 280–290° C. for approximately 5 to 6 hours. A warm up period from 125° C. to 280° C. of approximately 3 to 4 hours is used. (The autoclave is loaded while warm at 125° C.) The pressure rises to approximately 900 pounds per square inch at 280–290° C. with a maximum pressure of 920 pounds per square inch at 290° C. At the end of the autoclaving, the entire contents are discharged, without a preliminary vapor bleed off, into a suitable receptacle equipped with efficient condensers for condensing the acetone and water to a liquid state. The product in the receiver is at approximately 150° C. after the blow down. The last traces of volatile material are removed by applying a vacuum at this temperature. Average weight of the product is 3249 pounds. The product is then cooled to 50–80° C. and washed at that temperature with dilute alkali, and then with water to neutrality, after which it is dried. The viscosity of this product ranges from 24 to 33 poises at 30° C.

Although the invention is described in particular detail in the example for a composite acetone-diphenylamine product in which there is a charged acetone to diphenylamine ratio of approximately 2:1, and an iodine catalyst, it is to be understood that variations as to the amount and nature of the catalyst, and as to the ratios of the reactants can be made, and still be within the scope of the invention which contemplates that, in the reaction mix, the acetone be in molar excess over the diphenylamine so as to insure that at least one molecular proportion of the acetone be condensed with one molecular proportion of the diphenylamine.

While we have shown and described various embodiments of the invention, it is to be understood that the invention is susceptible to other modifications which appear within the spirit of the invention and the scope of the appended claims.

Having thus described our invention, what we claim and desire to protect by Letters Patent is:

1. In a method of manufacturing a composite acetone-diphenylamine condensate by autoclaving one molecular proportion of the diphenylamine and in excess of one molecular proportion of the acetone in the presence of at least one halogen-containing catalyst selected from the class consisting of halogen, hydrogen halides, and halides of iron, aluminum, tin, zinc, nickel, antimony, bismuth, cobalt, copper and manganese, the halogen in each case being a member of the group consisting of bromine and iodine, the improvement which consists in carrying out the said reaction, in which the diphenylamine and the acetone are the sole original reactants, at a temperature substantially above 250° C. but not above 310° C., for from 3 to 10 hours, and forming a composite condensate which when freed of excess unreacted acetone, and water, has a viscosity from 5 to 100 poises at 30° C. and a diphenylamine content ranging from about 10 to about 20%.

2. In a method of manufacturing a composite acetone-diphenylamine condensate by autoclaving one molecular proportion of the diphenylamine and in excess of one molecular proportion of the acetone in the presence of at least one halogen-containing catalyst selected from the class consisting of halogen, hydrogen halides, and halides of iron, aluminum, tin, zinc, nickel, antimony, bismuth, cobalt, copper and manganese, the halogen in each case being a member of the group consisting of bromine and iodine, the improvement which consists in carrying out the said reaction in which the diphenylamine and the acetone are the sole original reactants, at a temperature substantially above 250° C. but not above 310° C., for from 3 to 10 hours, and forming a composite condensate which when freed of excess unreacted acetone, and water, has a viscosity from 5 to 70 poises at 30° C. and a diphenylamine content ranging from about 10 to about 20%.

3. A method of making a free-flowing low viscosity composite product of condensation of acetone and diphenylamine which comprises bringing into contact with in excess of one molecular proportion of acetone, and one molecular proportion of diphenylamine, in which the acetone and the diphenylamine are the sole original reactants, a catalytic amount of at least one halogen-containing catalyst selected from the class consisting of halogen, hydrogen halides, and halides of iron, aluminum, tin, zinc, nickel, antimony, bismuth, cobalt, copper and manganese, the halogen in each case being a member of the group consisting of bromine and iodine, and heating the materials in the temperature range of 275–310° C. for from 3 to 10 hours, and forming a composite condensate which when freed of excess unreacted acetone, and water, has a viscosity of from 5 to 100 poises at 30° C. and a diphenylamine content ranging from about 10 to about 20%.

4. A free flowing low viscosity composite acetone-diphenylamine condensate resulting from a process as set forth in claim 1, having a viscosity at 30° C. of from 5 to 100 poises and in which the diphenylamine content ranges from about 10 to about 20%, and which is further characterized in that when subjected to vacuum distillation at 20 mm. Hg pressure at 150–230° C. leaves a non-volatile residue amounting to not more than 45% by weight of the original product which is subjected to the vacuum distillation.

5. A free flowing low viscosity composite acetone-diphenylamine condensate resulting from a process as set forth in claim 2, having a viscosity at 30° C. of 5 to 70 poises in which the diphenylamine content ranges from about 10 to about 20%, and which is further characterized in that when subjected to vacuum distillation at 20 mm. Hg pressure at 150–230° C. leaves a non-volatile residue amounting to not more than 45% by weight of the original product which is subjected to the vacuum distillation.

6. A method of making a free flowing low viscosity composite product of condensation of acetone and diphenylamine which comprises bringing into contact with in excess of one molecular proportion of acetone, and one molecular proportion of diphenylamine, in which the acetone and the diphenylamine are the sole original reactants, a catalytic amount of at least one halogen-containing catalyst selected from the class consisting of halogen, hydrogen halides, and halides of iron, aluminum, tin, zinc, nickel, antimony, bismuth, cobalt, copper and manganese, the halogen in each case being a member of the group consisting of bromine and iodine, and heating the materials in the temperature range of 275–310° C. for from 3 to 10 hours, cooling the reaction mix, removing any excess acetone, washing the resulting reaction mix with aqueous alkali to remove any residual acidic catalyst that may be present, and drying, and forming a composite free flowing acetone-diphenylamine anti-oxidant having a viscosity of from 5 to 100 poises at 30° C. and a diphenylamine content ranging from about 10 to about 20%.

7. A method of making a free flowing low viscosity composite product of condensation of acetone and diphenylamine which comprises bringing into contact with in excess of one molecular proportion of acetone, and one molecular proportion of diphenylamine, in which the acetone and the diphenylamine are the sole original reactants, a catalytic amount of a ferrous iodide catalyst, and heating the materials in the temperature range of 275–310° C. for from 3 to 10 hours, cooling the reaction mix, removing any excess acetone, washing the resulting reaction mix with aqueous alkali to remove any residual acidic catalyst that may be present, and drying, and forming a composite free flowing acetone-diphenylamine anti-oxidant having a viscosity of from 5 to 100 poises at 30° C. and a diphenylamine content ranging from about 10 to about 20%.

8. A free flowing low viscosity composite acetone-diphenylamine condensate resulting from a process as set forth in claim 3, having a viscosity at 30° C. of 5 to 100 poises, and in which the diphenylamine content ranges from about 10 to about 20%, and which is further characterized in that when subjected to vacuum distillation at 20 mm. Hg pressure at 150–230° C. leaves a non-volatile residue amounting to not more than 45% by weight of the original product which is subjected to vacuum distillation.

IVAN MANKOWICH.
CHALMERS H. DAY.

REFERENCES CITED

The following references are of record in the file of this patent:

UNITED STATES PATENTS

| Number | Name | Date |
|---|---|---|
| 1,915,108 | Horst | June 20, 1933 |
| 1,935,279 | Horst | Nov. 14, 1933 |
| 1,945,576 | Horst | Feb. 6, 1934 |
| 1,975,167 | Meuser | Oct. 2, 1934 |
| 2,000,041 | Semon | May 7, 1935 |
| 2,002,642 | Meuser | May 28, 1935 |
| 2,026,386 | Howland | Dec. 31, 1935 |
| 2,202,934 | Tuley et al. | June 4, 1940 |

FOREIGN PATENTS

| Number | Country | Date |
|---|---|---|
| 359,773 | Great Britain | Oct. 29, 1931 |
| 520,717 | Great Britain | May 1, 1940 |
| 521,576 | Great Britain | May 24, 1940 |
| 522,401 | Great Britain | June 17, 1940 |